(12) United States Patent
Lee et al.

(10) Patent No.: US 7,466,989 B2
(45) Date of Patent: Dec. 16, 2008

(54) SYNCHRONIZATION METHOD FOR TERMINAL-TO-TERMINAL DIRECT COMMUNICATION IN TIME DIVISION DUPLEX MOBILE COMMUNICATION SYSTEM

(75) Inventors: Ju-Ho Lee, Suwon-si (KR); Jeong-Gon Kim, Seoul (KR); Gaoke Du, Beijing (CN); Xiaoqiang Li, Beijing (CN); Guizia Yan, Beijing (CN)

(73) Assignees: Samsung Electronics Co., Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 0 days.

(21) Appl. No.: 10/545,209

(22) PCT Filed: Feb. 11, 2004

(86) PCT No.: PCT/KR2004/000275

§ 371 (c)(1),
(2), (4) Date: Jun. 21, 2006

(87) PCT Pub. No.: WO2004/073209

PCT Pub. Date: Aug. 26, 2004

(65) Prior Publication Data
US 2006/0240854 A1 Oct. 26, 2006

(30) Foreign Application Priority Data
Feb. 11, 2003 (CN) .................................. 03 1 03810

(51) Int. Cl.
*H04B 7/212* (2006.01)
*H04B 7/00* (2006.01)
*H04B 15/00* (2006.01)

(52) U.S. Cl. ...................... 455/502; 455/501; 370/321; 370/324

(58) Field of Classification Search ................. 455/502, 455/501, 450–452, 63.1, 114.1, 114.2; 370/324, 370/321
See application file for complete search history.

(56) References Cited

U.S. PATENT DOCUMENTS 4,107,608 A * 8/1978 Saburi ........................ 370/324

(Continued)

FOREIGN PATENT DOCUMENTS

EP 471656 2/1992

(Continued)

OTHER PUBLICATIONS

Black, Uyless. Second Generation Mobile and Wireless Networks. Upper Saddle River, New Jersey: Prentice Hall PTR, 1999. 17.*

*Primary Examiner*—Matthew D Anderson
*Assistant Examiner*—Bobbak Safaipour
(74) *Attorney, Agent, or Firm*—Roylance, Abrams, Berdo & Goodman, LLP

(57) ABSTRACT

A method for the terminal-to-terminal direct communication in the TDMA mobile communication system includes the following steps when making use of the uplink timeslots of the normal communication: in the initial phase, a sender still transmits a signal to a receiver according to its transmission timing for the normal communication; the receiver detects signals of its surrounding terminals that are in normal communication, and selects one with the strongest power as the strongest interference signal; the receiver detects the signal from the sender and compares the arrival time of the sender's signal with that of the strongest interference signal, and thereby obtains an adjustment control instruction for the sender, and feedback the control instruction to the sender; the sender adjusts its transmission timing according to the control instruction that it receives. This invention solves the synchronization problem of the direct communication in the TDD mobile communication system.

7 Claims, 2 Drawing Sheets

U.S. PATENT DOCUMENTS

| | | | |
|---|---|---|---|
| 4,831,624 A * | 5/1989 | McLaughlin et al. | 714/781 |
| 5,084,891 A * | 1/1992 | Ariyavisitakul et al. | 714/775 |
| 5,138,616 A * | 8/1992 | Wagner et al. | 714/704 |
| 5,230,082 A * | 7/1993 | Ghisler et al. | 455/438 |
| 5,430,724 A * | 7/1995 | Fall et al. | 370/337 |
| 5,491,719 A * | 2/1996 | Sellin et al. | 375/213 |
| 5,515,366 A * | 5/1996 | Chieu et al. | 370/347 |
| 5,515,397 A * | 5/1996 | Wiorek | 375/216 |
| 6,119,016 A * | 9/2000 | Matusevich | 455/502 |
| 6,549,784 B1 * | 4/2003 | Kostic et al. | 455/501 |
| 6,684,070 B1 * | 1/2004 | Rosen et al. | 455/427 |
| 6,965,568 B1 * | 11/2005 | Larsen | 370/238 |
| 7,016,320 B1 * | 3/2006 | Petersson et al. | 370/331 |
| 7,218,630 B1 * | 5/2007 | Rahman | 370/355 |
| 2002/0001299 A1 * | 1/2002 | Petch et al. | 370/350 |
| 2002/0098860 A1 * | 7/2002 | Pecen et al. | 455/522 |
| 2002/0177412 A1 * | 11/2002 | Hiramatsu et al. | 455/63 |
| 2003/0058821 A1 * | 3/2003 | Lee et al. | 370/335 |
| 2003/0147367 A1 * | 8/2003 | Pucheu et al. | 370/337 |
| 2003/0228865 A1 * | 12/2003 | Terry | 455/422.1 |
| 2004/0235506 A1 * | 11/2004 | Roettger et al. | 455/502 |
| 2005/0226173 A1 * | 10/2005 | Strawczynski et al. | 370/278 |
| 2006/0078039 A1 * | 4/2006 | Dhar et al. | 375/132 |

FOREIGN PATENT DOCUMENTS

| | | |
|---|---|---|
| EP | 1049339 | 11/2000 |
| EP | 1262082 | 12/2002 |
| KR | 2001-91143 | 10/2001 |
| WO | 9505037 | 11/2000 |

* cited by examiner

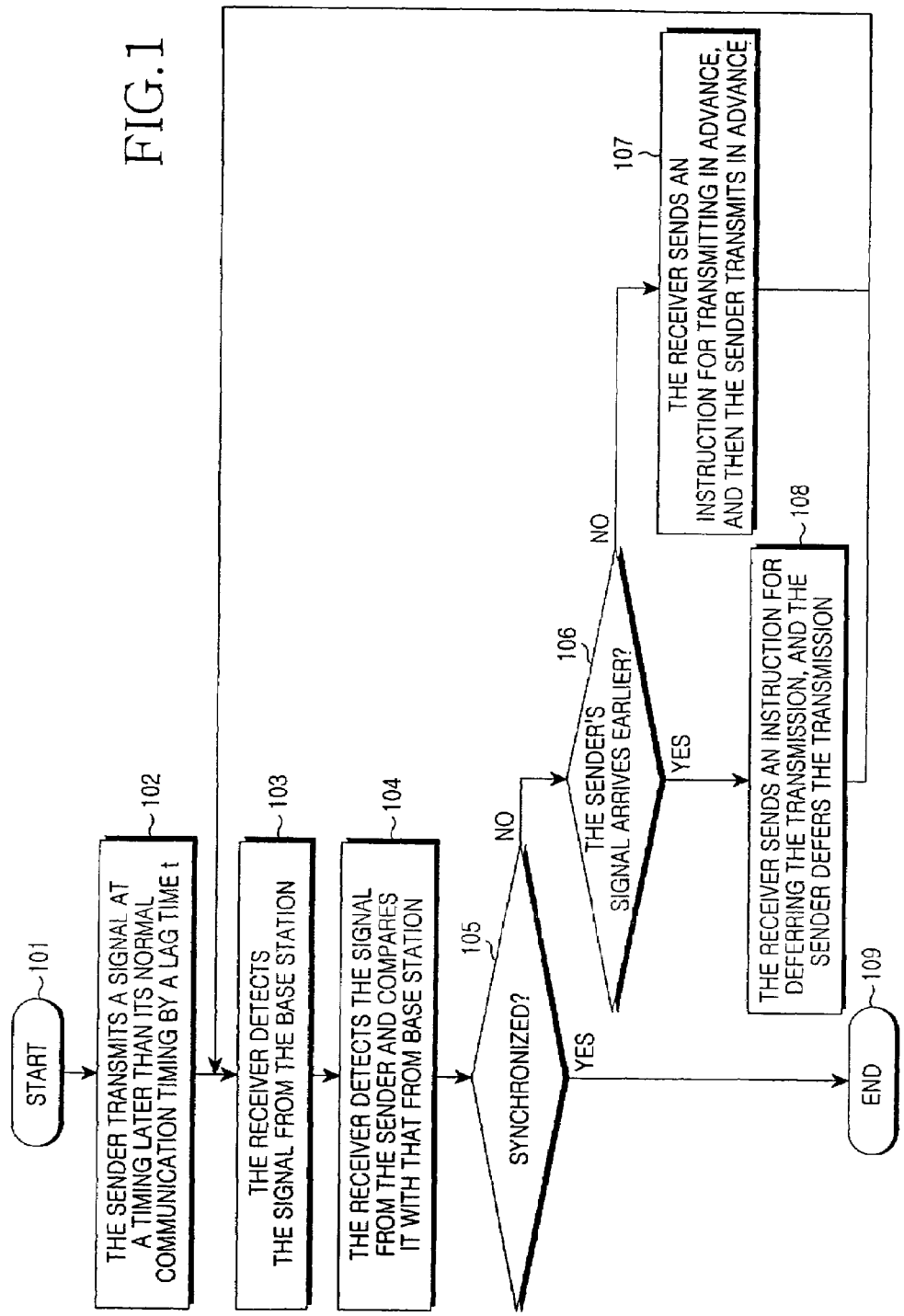

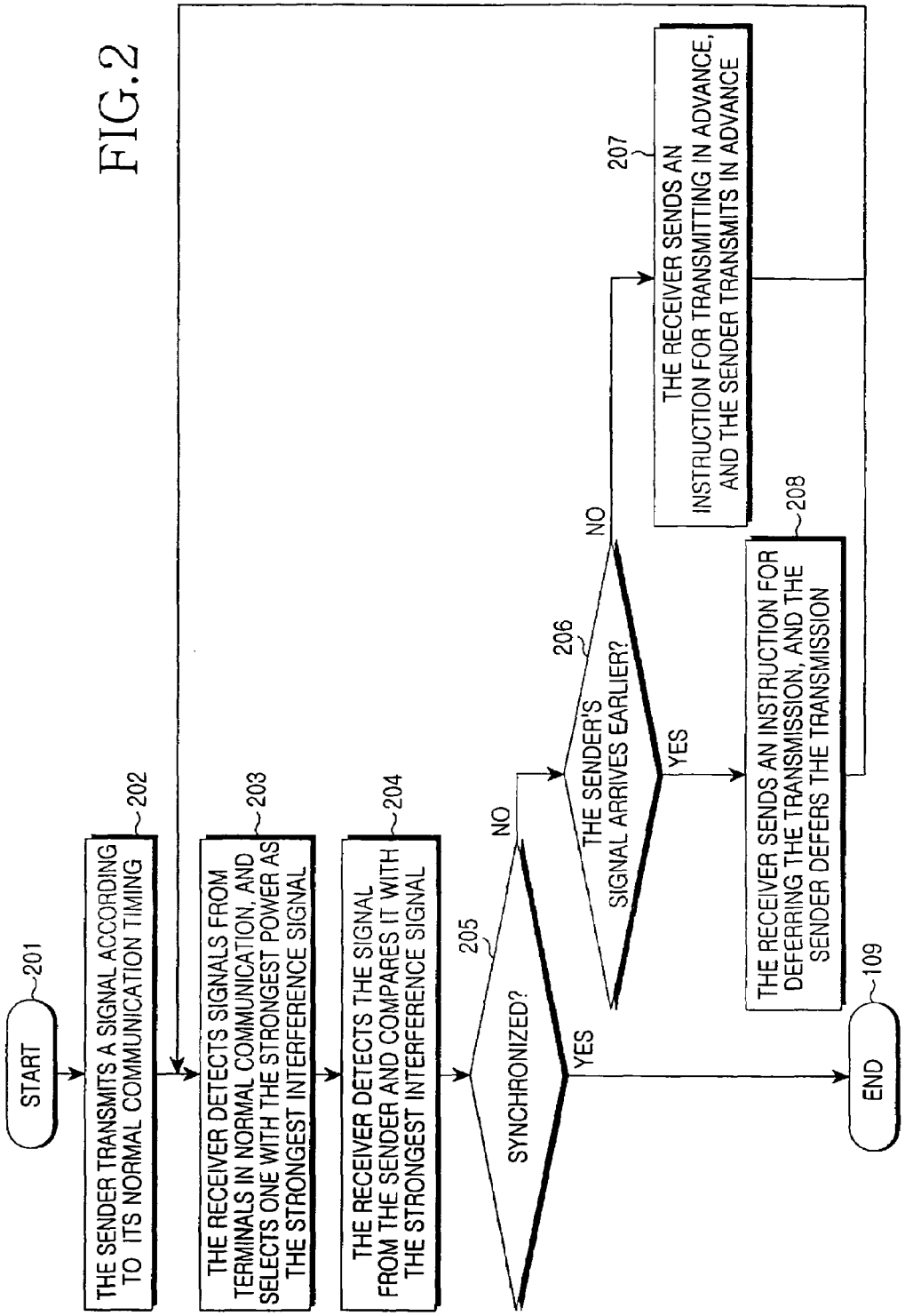

SYNCHRONIZATION METHOD FOR TERMINAL-TO-TERMINAL DIRECT COMMUNICATION IN TIME DIVISION DUPLEX MOBILE COMMUNICATION SYSTEM

BACKGROUND OF THE INVENTION

1. Field of the Invention

This invention relates to a synchronization method proposed for the terminal-to-terminal direct communication (simplified as the direct communication hereinafter) under the Time Division Duplex mode (simplified as TDD hereinafter) in a Mobile Communication System.

2. Description of the Prior Art

Synchronization is a key technology in the TDMA communication system. Similar to other TDMA systems, a TDD system needs accurate synchronization between terminals and a base station.

Due to the mobility of the terminals in the mobile communication system, the distances between the terminals and the base station are variant, so the time delay of the signals transmitted from the terminals to the base station via wireless channel is thus variant. Thus, the synchronization issue of TDMA mobile communication system becomes more complex and important.

In the existing TDD system, considering the radio propagation delay, each terminal transmits signal in advance with certain timing based on its distance from the base station in order to compensate for the propagation delay, which enables signals from different terminals arrive at the base station synchronously after different propagation delays. The receiving timing of the base station is a reference for transmission timing of other terminals. The base station sends a synchronization instruction to the terminal, and the terminal adjusts its transmission timing timely according to the synchronization instruction, which makes the uplink signals of all the terminals realize complete synchronization at the base station.

At present, the standards specified by $3^{rd}$ Generation Partnership Project (3GPP) still didn't concern with the direct communication. All synchronizations in the existing standards are synchronization between the terminals and the base station. The differences between the direct communication and the normal communication consist in that the direct communication is realized directly between terminals without participation of the base station, and it is a direct signal transmitting/receiving between the terminals, wherein the sender and the receiver are both terminals and participation of the base station is not needed during the communication process. In this case, the synchronization methods in the former standards are not applicable to the synchronization of the direct communication. Thus we need to specify a new synchronization method for the direct communication.

SUMMARY OF THE INVENTION

The object of this invention is to propose a synchronization method for the direct communication mode.

To obtain the above object, according to one aspect of this invention, a method for the terminal-to-terminal direct communication in the TDMA mobile communication system includes following steps when making use of the uplink timeslots in the normal communication:

In the initial phase, a direct-communication sender still transmits a signal to its opposite receiver according to the transmission timing for the normal communication;

The receiver detects signals from its surrounding senders that are in the normal communication, and selects one with the strongest power as the strongest interference signal The receiver detects the signal from its opposite sender and compares the arrival time of the sender's signals with that of the strongest interference signal, and thereby obtains an adjustment control instruction for the sender, and feedback the control instruction to the sender;

The sender adjusts its transmission timing according to the control instruction that it receives.

According to another aspect of this invention, a method for the terminal-to-terminal direct communication in the TDMA mobile communication system includes following steps when making use of the downlink timeslots in the normal communication:

In the initial phase, a direct-communication sender transmits a signal at a timing later than its transmission timing in the normal communication by a lag time t to its opposite receiver;

The receiver estimates the arrival time of a signal from a base station;

The receiver detects the signals from its sender and compares the arrival time of the sender's signal with that of the signal from the base station, which obtains an adjustment control instruction for the sender, and feedback the control instruction to the sender;

The sender adjusts its transmission timing according to the control instruction that it receives.

This invention solves the synchronization problem of the direct communication in the TDD mobile communication system. As the existing standards have no related contents on the direct communication and its synchronization method, this invention is an enhancement to the existing standards. As the direct communication will be interfered by the normal communication unavoidably, the synchronization method proposed in this invention can reduce the directed communication suffered interference, which is caused by normal communication, as small as possible. As it can effectively reduce the interference brought by the normal communication, the receiving performance of the direct communication can be improved. Another advantage brought by the synchronization is to extend the coverage range. As the receiving performance is improved, it enables the direct communication with a larger coverage range. In addition, it is easy to transfer from the synchronization control of the normal communication to that of the direct communication.

When making use of the downlink timeslots in the normal communication, the method includes the following steps: in the initial phase, a sender transmits a signal at a timing later than its transmission timing in the normal communication by a lag time t to a receiver; the receiver estimates the arrival time of a signal from a base station; the receiver detects the signals from its sender and compares the arrival time of the sender's signal with that of the signal from the base station, which obtains an adjustment control instruction for the sender, and feedback the control instruction to the sender; the sender adjusts its transmission timing according to the control instruction that it receives.

BRIEF DESCRIPTION OF THE DRAWINGS

The above and other features and advantages of the present invention will become more apparent by describing in detail exemplary embodiments thereof with reference to the attached drawings in which:

FIG. 1 is a flowchart of Method 1 for the synchronization process of the direct communication;

FIG. 2 is a flowchart of Method 2 for the synchronization process of the direct communication.

DETAILED DESCRIPTION OF THE PREFERRED EMBODIMENTS

In order to solve the synchronization problem between terminals for the terminal-to-terminal direct communication, the invention provides two methods as follow:

Method 1 is to implement the synchronization of direct communication by making use of the downlink timeslots in the normal communication.

The downlink timeslots in the normal communication are the timeslots in which a base station transmits a signal to a terminal. At this time, the base station transmits a signal and the terminal receives it. In this case, the base station in the normal communication will transmit a signal to the terminal in the normal communication, thus the receiver in the direct communication will receive interference from the base station signal in the normal communication.

Method 1 could implement the synchronization for the direct communication by making use of the signal from the base station as a synchronization reference. The receiver in the direct communication sends a control instruction to the sender in the direct communication to adjust the transmission timing of the sender, which makes the sender's signal arrive at the receiver in the direct communication in synchronization with the base station signal in normal communication, and realizes the synchronization.

Method 2 is to implement the synchronization of the direct communication by making use of the uplink timeslots in the normal communication The uplink timeslots in the normal communication are the timeslots in which the terminal transmits a signal to the base station. At this time, the base station receives a signal and the terminal transmits it. In this case, the terminal in the normal communication will transmit a signal to the base station in the normal communication, so the receiver in the direct communication will receive interference from the terminal's signal in normal communication. Moreover, there will be multiple terminals in the normal communication being transmitting signals in the uplink timeslots, and these signals will interfere the direct communication. As the distances of the communication terminals in the normal communication from the receiver in the direct communication are different, the interference strength and arrival time are different also.

Method 2 makes use of the strongest signal from terminals in the normal communication as the synchronization reference to realize the synchronization of the direct communication. The receiver in the direct communication sends a control instruction to the sender in direct communication to adjust the transmission timing of the sender, which makes the sender's signal arrive at the receiver of the direct communication in synchronization with the strongest terminal's signal in the normal communication, and realizes the synchronization.

The processes of using the two methods will be described in detail below.

The synchronization process of Method 1 is shown in FIG. 1. This process is divided into following steps.

Step 1: In initial phase (just the moment transition from normal communication to direct communication), the sender transmits a signal at a timing later than its transmission timing in normal communication by a lag time t to the receiver. The sender roughly obtains the lag time t, according to its distance from the base station.

Step 2: The receiver estimates the arrival time of the signal from the base station.

Step 3: The receiver detects the signal from the sender, and compares the arrival time of the sender's signal with that of the signal from the base station, and thereby obtains an adjustment control instruction for the sender (if the sender's signal arrives later than the signal from the base station, send the instruction of "transmitting in advance"; otherwise, send "deferring the transmission".), and feedback the control instruction to the sender;

Step 4: The sender adjusts its transmission timing according to the control instruction that it receives.

Step 5: Return back to Step 2 until the synchronization is established.

The synchronization process of Method 2 is shown in FIG. 2. This process is divided into following steps:

Step 1: In the initial phase, the sender still transmits a signal to the receiver according to its transmission timing in the normal communication;

Step 2: The receiver detects signals from its surrounding senders that are in the normal communication, and selects one with the strongest power as the strongest interference signal.

Step 3: The receiver detects the signal from the sender, compares the arrival time of the sender's signal with that of the strongest interference signal, and thereby obtains an adjustment control instruction for the sender (if the sender's signal arrives later than the, strongest interference signal, send the instruction of "transmitting in advance"; otherwise, send "deferring the transmission".), and feedback the control instruction to the sender.

Step 4: The sender adjusts its transmission time according to the control instruction that it receives.

Step 5: Return back to Step 2 until the synchronization is established.

This invention solves the synchronization problem of the direct communication in the TDD mobile communication system. As the existing standards have no related contents on direct communication and its synchronization method, this invention provides an enhancement of the existing standards and a solution of direct communication between terminals.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A synchronization method for terminal-to-terminal direct communication in a TDMA mobile communication system, comprising:
    detecting signals to a receiver from surrounding terminals that transmit signals for communication;
    selecting from the surrounding terminals' detected signals a strongest interference signal, the strongest interference signal having the strongest power;
    detecting a first signal from a sender and comparing a first arrival time of the first signal with a second arrival time of the strongest interference signal; and
    obtaining an adjustment control instruction for direct communication synchronization for the sender based on the comparing of the first arrival time of the first signal and the second arrival time of the strongest interference signal, and feeding back the adjustment control instruction to the sender so that the sender adjusts a transmission timing of the first signal according to the adjustment control instruction.

2. The method as defined in claim 1, wherein the detecting of the first signal and the strongest interference signal comprises:

if the first signal arrives later than the strongest interference signal, sending a first control instruction for transmitting in advance;

if the first signal arrives earlier than the strongest signal, sending a second control instruction for deferring the transmitting.

3. The method as defined in claim 1, wherein the communication comprises using uplink time slots.

4. A synchronization method for terminal-to-terminal direct communication in a TDMA mobile communication system, comprising:

receiving at a receiver a first signal from a sender for the terminal-to-terminal direct communication at a timing later than a transmission timing by a lag time t;

receiving a second signal from a base station at a second arrival time;

comparing a first arrival time of the first signal with the second arrival time of the second signal;

obtaining an adjustment control instruction for direct communication synchronization for the sender based on the comparing of the first arrival time of the first signal and the second arrival time of an interference signal, and feeding back the adjustment control instruction to the sender so that the sender adjusts a transmission timing of the first signal according to the adjustment control instruction.

5. The method as defined in claim 4, wherein the detecting of the first and second signals comprises:

if the first signal arrives later than the second signal, sending a first control instruction for transmitting in advance;

if the first signal arrives earlier than the second signal, sending a second control instruction for deferring the transmitting.

6. The method as defined in claim 4, further comprising estimating a value of the lag time t according to a distance from the base station to the sender.

7. The method as defined in claim 4, wherein the communication comprises using downlink time slots.

* * * * *